United States Patent
Zhang

(10) Patent No.: US 10,050,452 B2
(45) Date of Patent: Aug. 14, 2018

(54) POWER ADAPTER AND TERMINAL

(71) Applicant: GUANG DONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 112 days.

(21) Appl. No.: 15/113,678

(22) PCT Filed: Jan. 9, 2015

(86) PCT No.: PCT/CN2015/070467
§ 371 (c)(1),
(2) Date: Jul. 22, 2016

(87) PCT Pub. No.: WO2015/113464
PCT Pub. Date: Aug. 6, 2015

(65) Prior Publication Data
US 2017/0018940 A1 Jan. 19, 2017

(30) Foreign Application Priority Data

Jan. 28, 2014 (CN) .......................... 2014 1 0042717
Jan. 28, 2014 (CN) .......................... 2014 1 0043064
Jan. 28, 2014 (CN) .......................... 2014 1 0043242

(51) Int. Cl.
*H02J 7/00* (2006.01)
*H02J 7/02* (2016.01)

(52) U.S. Cl.
CPC .......... *H02J 7/0036* (2013.01); *H02J 7/0004* (2013.01); *H02J 7/007* (2013.01); *H02J 7/0052* (2013.01);
(Continued)

(58) Field of Classification Search
CPC ........ H02J 7/0036; H02J 7/0052; H02J 7/007; H02J 7/02
(Continued)

(56) References Cited

U.S. PATENT DOCUMENTS

| 6,018,703 A * | 1/2000 | Dodd | G05B 13/024 |
| | | | 330/278 |
| 7,737,590 B2 * | 6/2010 | Oyama | F16C 32/0444 |
| | | | 310/68 B |

(Continued)

FOREIGN PATENT DOCUMENTS

| CN | 101414753 A | 4/2009 |
| CN | 103178595 A | 6/2013 |

(Continued)

OTHER PUBLICATIONS

EPO, Office Action, EP Appl. No. 15742819, Oct. 12, 2017.
SIPO, Office Action, CN Appl. No. 201580004388.5, Nov. 13, 2017.

Primary Examiner — M'Baye Diao
(74) Attorney, Agent, or Firm — Hodgson Russ LLP

(57) ABSTRACT

A power adapter and a terminal are provided. The power adapter includes a power conversion component and a charging interface, the power conversion component being configured to form a charging loop with a terminal via the charging interface for charging a battery of the terminal. The power adapter further includes a communication component and an adjustment component, the communication component is configured to receive a battery parameter sent by the terminal, the battery parameter being used for indicating at least one of a current electric quantity and a current voltage value of the battery of the terminal; and the adjustment component is configured to determine a target current value corresponding to the at least one of current voltage value and the current electric quantity of the battery, and to adjust an (Continued)

output current value of the power adapter to the target current value.

17 Claims, 1 Drawing Sheet

(52) U.S. Cl.
    CPC .............. *H02J 7/0073* (2013.01); *H02J 7/02* (2013.01); *H02J 2007/0059* (2013.01); *H02J 2007/0096* (2013.01)

(58) Field of Classification Search
    USPC .......................................... 320/107, 115, 137
    See application file for complete search history.

(56) References Cited

U.S. PATENT DOCUMENTS

| | | | |
|---|---|---|---|
| 9,337,919 B2* | 5/2016 | Kikuchi | H04B 7/24 |
| 2003/0146736 A1 | 8/2003 | Kosuda et al. | |
| 2004/0108843 A1* | 6/2004 | Lanni | G05F 1/56 |
| | | | 323/271 |
| 2005/0174094 A1* | 8/2005 | Purdy | H02J 7/0052 |
| | | | 320/134 |
| 2006/0284595 A1* | 12/2006 | Hsieh | H02J 7/0077 |
| | | | 320/115 |
| 2007/0128899 A1* | 6/2007 | Mayer | G06F 9/4406 |
| | | | 439/152 |
| 2010/0077237 A1* | 3/2010 | Sawyers | G06F 1/26 |
| | | | 713/300 |
| 2010/0186400 A1* | 7/2010 | Preston | F03G 7/10 |
| | | | 60/325 |
| 2011/0037438 A1 | 2/2011 | Bhardwaj et al. | |
| 2012/0268074 A1* | 10/2012 | Cooley | H01G 11/58 |
| | | | 320/130 |
| 2013/0002200 A1 | 1/2013 | Kobayashi et al. | |
| 2013/0038297 A1 | 2/2013 | Sang et al. | |
| 2013/0175978 A1* | 7/2013 | Hsiao | H02J 7/02 |
| | | | 320/107 |

FOREIGN PATENT DOCUMENTS

| | | |
|---|---|---|
| CN | 103199582 A | 7/2013 |
| CN | 103219769 A | 7/2013 |
| CN | 103236568 A | 8/2013 |
| CN | 203135543 | 8/2013 |
| CN | 103746434 | 4/2014 |
| CN | 103762702 | 4/2014 |
| EP | 2187497 A1 | 5/2010 |
| JP | 2009106010 A | 5/2009 |

* cited by examiner

POWER ADAPTER AND TERMINAL

CROSS-REFERENCE TO RELATED APPLICATIONS

This application is a US national phase application based up an International Application No. PCT/CN2015/070467, filed on Jan. 9, 2015, which is based on and claims priority to Chinese Patent Application No. 201410042717.2, filed on Jan. 28, 2014; No. 201410043242.9, filed on Jan. 28, 2014; No. 201410043064.X, filed on Jan. 28, 2014, the entire contents of which are incorporated herein by reference.

TECHNICAL FIELD

The present disclosure generally relates to the charging technical field, and more particularly, to a power adapter and a terminal.

BACKGROUND

With the progress of the times, the internet and mobile communication network provide massive functions and applications. A user not only can use a mobile terminal to perform conventional applications, such as use a smart phone to answer a call or call somebody up, but also can use the mobile terminal to browse a webpage, transmit a picture or play a game and so on.

With the increasing usage frequency of the mobile terminal, it is required to charge the mobile terminal frequently. In the related art, many power adapters charge the terminal with constant current, which is easy to implement, but cannot adjust the charging current according to actual situations of the terminal, thereby being inflexible. For example, if a voltage of a battery is too low, it is better to use large current to charge the battery quickly; if the voltage of the battery is very high, it is better to use lower current for charging, so as to avoid overcharge.

SUMMARY

Embodiments of the present disclosure provide a power adapter and a terminal, so as to increase flexibility of choosing the charging current.

In an embodiment, a power adapter is provided. The power adapter includes a power conversion component and a charging interface, the power conversion component is configured to form a charging loop with a terminal via the charging interface for charging a battery of the terminal. The power adapter further includes a communication component and an adjustment component. The communication component is configured to receive a battery parameter sent by the terminal, in which the battery parameter is used for indicating a current electric quantity or a current voltage value of the battery of the terminal. The adjustment component is configured to determine a target current value corresponding to the current voltage value or the current electric quantity of the battery, and to adjust an output current value of the power adapter to the target current value.

In an embodiment, a terminal is provided. The terminal includes a battery and a charging interface. The terminal is configured to form a charging loop with a power adapter via the charging interface for charging the battery. The terminal further includes a detection component and a communication component. The detection component is configured to detect a current electric quantity or a current voltage value of the battery of the terminal; and the communication component is configured to send a battery parameter indicating the current electric quantity or the current voltage value to the power adapter, such that the power adapter adjusts an output current to a current value corresponding to the current electric quantity or the current voltage value.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 1:
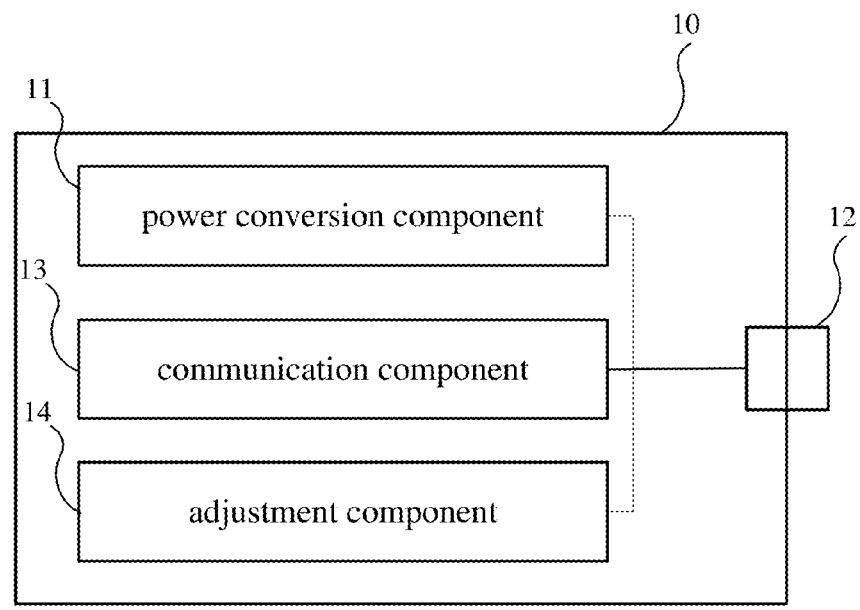
FIG. 1 is a block diagram of a power adapter according to an embodiment of the present disclosure.

FIG. 1 is a block diagram of a power adapter according to an embodiment of the present disclosure. The power adapter 10 shown in FIG. 1 includes a power conversion component 11 and a charging interface 12. The power conversion component 11 is configured to form a charging loop with a terminal via the charging interface 12 for charging a battery of the terminal. The power adapter 10 further includes a communication component 13 and an adjustment component 14.

The communication component 13 is configured to receive a battery parameter sent by the terminal. The battery parameter is used for indicating a current voltage value or a current electric quantity of the battery of the terminal.

The adjustment component 14 is configured to determine a target current value corresponding to the current voltage value or the current electric quantity of the battery, and to adjust an output current value of the power adapter 10 to the target current value.

As an example, if the current voltage value of the battery is within a range from 0V to 4.3V, the target current value may be set as 4 A; if the current voltage value of the battery is within a range from 4.3V to 4.32V, the target current value may be set as 3 A; if the current voltage value of the battery is within a range from 4.32V to 4.35V, the target current value may be set as 2 A; and if the current voltage value of the battery exceeds 4.35V, the target current value may be set as a few hundreds mA.

In embodiments of the present disclosure, the power adapter firstly obtains the current electric quantity or the current voltage of the battery from the terminal, and then adjusts the output current to the target current value corresponding to the current electric quantity or the current voltage, thus realizing adjusting the output current of the power adapter according to the current electric quantity or the current voltage of the battery of the terminal, which is more flexible compared to the related art.

In an embodiment, the adjustment component 14 is configured to determine the target current value corresponding to the current voltage value or the current electric quantity of the battery by performing following operations of: selecting a target interval containing the current voltage value from N intervals of voltage values, where N is a positive integer; determining a current value corresponding to the target interval according to the target interval and according to a correspondence between the N intervals and N current values; and determining the current value corresponding to the target interval as the target current value.

In at least one embodiment, voltage values in the above N intervals may not overlap with each other, and the N intervals may be continuous intervals of voltage values, or may be discrete intervals of voltage values.

In the related art, large constant current is usually used to charge the battery, which reduces the charging time to a certain extent, but is easy to cause safety risk. For example, during continuous charging with large current, if the power adapter is not decoupled from the battery in time when the battery is about to be charged fully, it can damage the battery or the charging circuit, or even cause fire.

In an embodiment, a minimum voltage value in a (i+1)th interval of the N intervals is greater than a maximum voltage value in a ith interval of the N intervals, and a current value corresponding to the (i+1)th interval is less than a current value corresponding to the ith interval, where i is an integer selected from 1 to N.

In embodiments of the present disclosure, the greater the voltage values in the interval of voltage values are, the lower the current value corresponding to the interval is. In this way, the power adapter charges the terminal with constant current in multiple stages, in which the charging current reduces gradually, thus avoiding the safety problem caused by always charging the terminal with large constant current.

In an embodiment, the adjustment component 14 is configured to determine the target current value corresponding to the current voltage value or the current electric quantity of the battery by performing following operations of: selecting a target interval containing the current voltage value from N intervals of voltage values, where N is a positive integer; determining a set of current values corresponding to the target interval according to the target interval and according to a correspondence between the N intervals and N sets of current values; and selecting the target current value from the set of current values.

As an example, if the voltage value of the battery is within a range from 0V to 4.3V, the target current value may be set as 3.5~4 A; if the received voltage value of the battery is within a range from 4.3V to 4.32V, the target current value may be set as 3~3.5 A; if the voltage value of the battery is within a range from 4.32V to 4.35V, the target current value may be set as 2~3 A; and if the current voltage value of the battery exceeds 4.35V, the target current value may be set as a few hundreds mA. Furthermore, the target current value may be selected from the set of current values randomly, or the median value in the set of current values may be selected as the target current value.

In an embodiment, the adjustment component 14 is configured to determine the target current value corresponding to the current voltage value or the current electric quantity of the battery by performing following operations of: selecting a target interval containing the current voltage value from N intervals of voltage values, where N is a positive integer; determining a current value and a charging time respectively corresponding to the target interval according to the target interval and according to a correspondence between the N intervals, N current values and N charging time, and determining the current value corresponding to the target interval as the target current value. The power conversion component 11 is configured to charge the terminal for the charging time corresponding to the target interval according to the target current value.

For example, a mapping table of current values, charging time, and the intervals of voltage values may be established in advance at the power adapter side. When the current voltage value of the battery is obtained from the terminal, the corresponding current value (current value a) and charging time (charging time b) can be found by looking up the mapping table, and then the power adapter charges the terminal according to the current value a for the charging time b. At the end of the charging time b, the power adapter can obtain the current voltage value of the battery from the terminal again, and execute the present operation repeatedly.

In at least one embodiment, the power adapter can also obtain the voltage value or the electric quantity of the battery from the terminal only at the beginning of charging, and then find the target current value corresponding to the voltage value or the electric quantity. Next, the power adapter outputs the target current value for charging the terminal, and subsequent charging process may be performed according to the preset charging strategy without obtaining the voltage or the electric quantity of the battery from the terminal again. As an example, after being coupled to the terminal, the power adapter obtains the current voltage of the battery as 4V, and determines the current corresponding to 4V as 3 A, and then charges the terminal according to the strategy of charging with 3 A for 10 minutes, charging with 2 A for 8 minutes, charging with 1 A for 6 minutes and charging with 500 mA for 3 minutes in sequence.

In an embodiment, the adjustment component 14 is configured to determine the target current value corresponding to the current voltage value or the current electric quantity of the battery by performing following operations of: selecting a target interval containing the current electric quantity from N intervals of electric quantity values, where N is a positive integer; and determining a current value corresponding to the target interval as the target current value, according to the target interval and according to a correspondence between the N intervals and N current values.

In an embodiment, a minimum electric quantity in a (i+1)th interval of the N intervals is greater than a maximum electric quantity in a ith interval of the N intervals, and a current value corresponding to the (i+1)th interval is less than a current value corresponding to the ith interval, where i is an integer selected from 1 to N.

In an embodiment, the communication component 13 is configured to receive the battery parameter sent by the terminal by performing following operations of: sending a charging parameter obtaining request message to the terminal; and receiving a charging parameter obtaining response message sent by the terminal. The charging parameter obtaining response message includes the battery parameter.

In an embodiment, the communication component 13 is configured to send the charging parameter obtaining request message to the terminal periodically.

In an embodiment, the charging interface 12 includes a power line and a data line. The power conversion component 11 is configured to form the charging loop with the terminal via the power line in the charging interface 12, for charging the battery of the terminal. The communication component 13 is configured to receive the battery parameter sent by the terminal via the data line in the charging interface.

In combination with FIG. 1, the power adapter of embodiments of the present disclosure has been described in detail. The terminal of embodiments of the present disclosure is hereinafter described in detail with reference to FIG. 2. In at least one embodiment, the terminal and the power adapter are two entities interacting with each other during the charging, the interaction operations or interaction information are identical or corresponding for the two entities, and the repetitive description of which will be omitted for simplicity.

Figure 2:
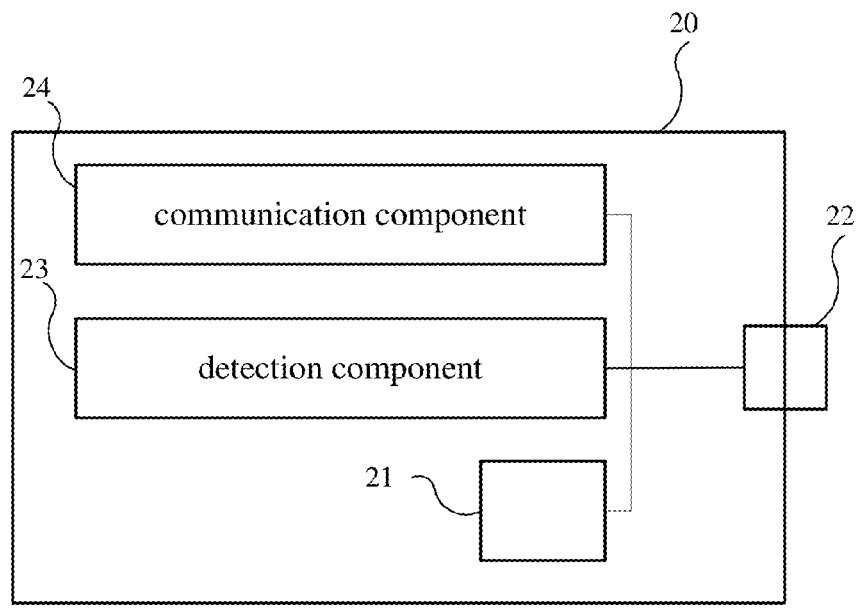
FIG. 2 is a block diagram of a terminal according to an embodiment of the present disclosure.

FIG. 2 is a block diagram of a terminal according to an embodiment of the present disclosure. The terminal 20 shown in FIG. 2 includes a battery 21 and a charging interface 22. The terminal 20 forms a charging loop with a power adapter via the charging interface 22 for charging the battery 21. The terminal 20 further includes a detection component 23 and a communication component 24. The detection component 23 is configured to detect a current electric quantity or a current voltage value of the battery 21 of the terminal 20. The communication component 24 is configured to send a battery parameter indicating the current electric quantity or the current voltage value to the power adapter, such that the power adapter adjusts an output current to a current value corresponding to the current electric quantity or the current voltage value.

In embodiments of the present disclosure, the terminal detects the current electric quantity or the current voltage value of the battery, and sends the battery parameter containing the current electric quantity or the current voltage value to the power adapter through the communication component, thus realizing adjusting the output current of the power adapter according to the current voltage or the current electric quantity of the battery, which is more flexible compared to the related art.

In an embodiment, the communication component 24 is further configured to receive a charging parameter obtaining request message from the power adapter. The detection component 23 is configured to detect the current electric quantity or the current voltage value of the battery after the charging parameter obtaining request message is received. The communication component 24 is configured to send the battery parameter indicating the current electric quantity or the current voltage value to the power adapter by sending the charging parameter obtaining response message to the power adapter, in which the charging parameter obtaining response message includes the battery parameter.

In an embodiment, the charging interface 22 includes a power line and a data line, the terminal 20 is configured to form the charging loop with the power adapter via the power line in the charging interface 22, for charging the battery. The communication component 24 is configured to send the battery parameter indicating the current electric quantity or the current voltage value to the power adapter by sending the battery parameter to the power adapter via the data line in the charging interface.

Those skilled in the art can be aware that, units and algorithm steps in respective examples described with reference to embodiments disclosed in the present disclosure can be realized by electronic hardware or combination of computer software and electronic hardware. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units may refer to corresponding process in the above method embodiments, which will not be elaborated herein.

It should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A power adapter, comprising a power conversion component and a charging interface, the power conversion component being configured to form a charging loop with a terminal via the charging interface for charging a battery of the terminal, wherein, the power adapter further comprises a communication component and an adjustment component, the communication component is configured to receive a battery parameter sent by the terminal, the battery parameter being used for indicating at least one of a current electric quantity and a current voltage value of the battery of the terminal; and the adjustment component is configured to determine a target current value corresponding to the at least one of current voltage value and the current electric quantity of the battery, and to adjust an output current value of the power adapter to the target current value;

wherein, the communication component is configured to perform following operations so as to receive the battery parameter sent by the terminal;

sending a charging parameter obtaining request message to the terminal; and receiving a charging parameter obtaining response message sent by the terminal, wherein the charging parameter obtaining response message comprises the battery parameter.

2. The power adapter according to claim 1, wherein, the adjustment component is configured to perform following operations so as to determine the target current value corresponding to the at least one of the current voltage value and the current electric quantity of the battery:

selecting a target interval containing the current voltage value from N intervals of voltage values, where N is a positive integer;

determining a current value corresponding to the target interval according to the target interval and according to a correspondence between the N intervals and N current values; and determining the current value corresponding to the target interval as the target current value.

3. The power adapter according to claim 2, wherein, a minimum voltage value in a (i+1)th interval of the N intervals is greater than a maximum voltage value in a ith interval of the N intervals, and a current value corresponding to the (i+1)th interval is less than a current value corresponding to the ith interval, where i is an integer selected from 1 to N.

4. The power adapter according to claim 2, wherein, the N intervals do not overlap with each other, and the N intervals are continuous intervals of voltage values.

5. The power adapter according to claim 2, wherein, the N intervals do not overlap with each other, and the N intervals are discrete intervals of voltage values.

6. The power adapter according to claim 2, wherein, the charging interface comprises a power line and a data line;

the power conversion component is configured to form the charging loop with the terminal via the power line in the charging interface, for charging the battery of the terminal;

the communication component is configured to receive the battery parameter sent by the terminal via the data line in the charging interface.

7. The power adapter according to claim 1, wherein, the adjustment component is configured to perform following operations so as to determine the target current value corresponding to the at least one of the current voltage value and the current electric quantity of the battery:

selecting a target interval containing the current voltage value from N intervals of voltage values, where N is a positive integer;

determining a set of current values corresponding to the target interval according to the target interval and according to a correspondence between the N intervals and N sets of current values; and selecting the target current value from the set of current values.

8. The power adapter according to claim 7, wherein, a median value in the set of current values is selected as the target current value.

9. The power adapter according to claim 1, wherein, the adjustment component is configured to perform following operations so as to determine the target current value corresponding to the at least one of the current voltage value and the current electric quantity of the battery: selecting a target interval containing the current voltage value from N intervals of voltage values, where N is a positive integer;

determining a current value and a charging time respectively corresponding to the target interval according to the target interval and according to a correspondence between the N intervals, N current values and N charging time; and determining the current value corresponding to the target interval as the target current value;

the power conversion component is configured to charge the terminal for the charging time corresponding to the target interval, according to the target current value.

10. The power adapter according to claim 1, wherein, the adjustment component is configured to perform following operations so as to determine the target current value corresponding to the at least one of the current voltage value and the current electric quantity of the battery:

selecting a target interval containing the current electric quantity from N intervals of electric quantity values, where N is a positive integer; and determining a current value corresponding to the target interval as the target current value, according to the target interval and according to a correspondence between the N intervals and N current values.

11. The power adapter according to claim 10, wherein, a minimum electric quantity in a (i+1)th interval of the N intervals is greater than a maximum electric quantity in a ith interval of the N intervals, and a current value corresponding to the (i+1)th interval is less than a current value corresponding to the ith interval, where i is an integer selected from 1 to N.

12. The power adapter according to claim 1, wherein, the communication component is configured to perform a following operation so as to send the charging parameter obtaining request message to the terminal:

sending the charging parameter obtaining request message to the terminal periodically.

13. The power adapter according to claim 1, wherein, the charging interface comprises a power line and a data line;

the power conversion component is configured to form the charging loop with the terminal via the power line in the charging interface, for charging the battery of the terminal;

the communication component is configured to receive the battery parameter sent by the terminal via the data line in the charging interface.

14. A terminal, comprising a battery and a charging interface, the terminal being configured to form a charging loop with a power adapter via the charging interface for charging the battery, wherein, the terminal further comprises a detection component and a communication component, the detection component is configured to detect at least one of a current electric quantity and a current voltage value of the battery of the terminal; and the communication component is configured to send a battery parameter indicating the at least one of the current electric quantity and the current voltage value to the power adapter, such that the power adapter adjusts an output current to a current value corresponding to the at least one of the current electric quantity and the current voltage value;

wherein, the communication component is further configured to receive a charging parameter obtaining request message from the power adapter;

the detection component is configured to detect the at least one of the current electric quantity and the current voltage value of the battery after the charging parameter obtaining request message is received; and the communication component is configured to perform a following operation so as to send the battery parameter indicating the at least one of the current electric quantity and the current voltage value to the power adapter: sending a charging parameter obtaining response message to the power adapter, wherein the charging parameter obtaining response message comprises the battery parameter.

15. The terminal according to claim 14, wherein, the charging interface comprises a power line and a data line;

the terminal is configured to form the charging loop with the power adapter via the power line in the charging interface, for charging the battery;

the communication component is configured to perform a following operation so as to send the battery parameter indicating the at least one of the current electric quantity and the current voltage value to the power adapter: sending the battery parameter to the power adapter via the data line in the charging interface.

16. The terminal according to claim 14, wherein, the charging interface comprises a power line and a data line;

the terminal is configured to form the charging loop with the power adapter via the power line in the charging interface, for charging the battery;

the communication component is configured to perform a following operation so as to send the battery parameter indicating the at least one of the current electric quantity and the current voltage value to the power adapter: sending the battery parameter to the power adapter via the data line in the charging interface.

17. A power adapter, comprising a power conversion component and a charging interface, the power conversion component being configured to form a charging loop with a terminal via the charging interface for charging a battery of the terminal, wherein, the power adapter further comprises a communication component and an adjustment component, the communication component is configured to receive a battery parameter sent by the terminal, the battery parameter being used for indicating at least one of a current electric quantity and a current voltage value of the battery of the terminal; and the adjustment component is configured to determine a target current value corresponding to the at least one of current voltage value and the current electric quantity of the battery, and to adjust an output current value of the power adapter to the target current value;

wherein, the adjustment component is configured to perform following operations so as to determine the target current value corresponding to the at least one of the current voltage value and the current electric quantity of the battery;

selecting a target interval containing the current voltage value from N intervals of voltage values, where N is a positive integer;

determining a current value corresponding to the target interval according to the target interval and according to a correspondence between the N intervals and N current values; and determining the current value corresponding to the target interval as the target current value.

* * * * *